(12) United States Patent
Polasa et al.

(10) Patent No.: US 11,983,974 B2
(45) Date of Patent: May 14, 2024

(54) SYSTEM AND METHOD FOR ULTRA-WIDEBAND SHORT-RANGE LOCATION ACCESS

(71) Applicant: BANK OF AMERICA CORPORATION, Charlotte, NC (US)

(72) Inventors: Puneetha Polasa, Telangana (IN); Hope Barus, Fort Mill, SC (US); Sandeep Kumar Chauhan, Hyderabad (IN); Ana Morales, Huntersville, NC (US); Sandra Ogden, Frisco, TX (US); Lee Ann Proud, St. Augustine, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 62 days.

(21) Appl. No.: 17/744,316

(22) Filed: May 13, 2022

(65) Prior Publication Data

US 2023/0368596 A1 Nov. 16, 2023

(51) Int. Cl.
*G07C 9/00* (2020.01)
*H04L 9/32* (2006.01)

(52) U.S. Cl.
CPC ..... *G07C 9/00912* (2013.01); *G07C 9/00658* (2013.01); *G07C 9/00817* (2013.01); *H04L 9/3228* (2013.01); *G07C 2009/00825* (2013.01)

(58) Field of Classification Search
CPC ............ G07C 9/00912; G07C 9/00658; G07C 9/00817; G07C 2009/00825; H04L 9/3228; H04M 11/02

USPC ........................................................ 340/5.73
See application file for complete search history.

(56) References Cited

U.S. PATENT DOCUMENTS

| 6,484,260 | B1* | 11/2002 | Scott ..................... G07F 7/1008 |
| | | | 713/182 |
| 7,597,250 | B2 | 10/2009 | Finn |
| 8,103,333 | B2 | 1/2012 | Tran |
| 8,482,378 | B2* | 7/2013 | Sadighi ................. G08C 17/02 |
| | | | 340/5.2 |
| 8,750,865 | B2 | 6/2014 | Karaoguz et al. |
| 9,083,581 | B1 | 7/2015 | Addepalli et al. |
| 9,301,337 | B2 | 3/2016 | Brown et al. |
| 9,330,561 | B2 | 5/2016 | Proud |
| 9,435,877 | B2 | 9/2016 | Bottazzi |
| 9,763,086 | B2* | 9/2017 | Benoit ............... G07C 9/00857 |
| 9,871,803 | B2 | 1/2018 | Das et al. |
| 9,905,100 | B2 | 2/2018 | Gillen et al. |
| 9,948,479 | B2* | 4/2018 | Bunker ................. H04L 12/282 |
| 9,959,694 | B2 | 5/2018 | Lindsay |

(Continued)

*Primary Examiner* — Nam V Nguyen
(74) *Attorney, Agent, or Firm* — Moore & Van Allen PLLC; Nicholas C. Russell

(57) ABSTRACT

Systems, computer program products, and methods are described herein for secure location and device access utilizing an ultra-wideband signal of a user device and a system device. The invention generally comprises determining that a user has entered a secure environment, wherein the secure environment comprises a safe-deposit box associated with the user, automatically generating a digital authentication key in response determining that the user has entered the secure environment, verifying the digital authentication key as being linked to the user, and transmitting instructions to a safe-deposit box to unlock and provide access during the scheduled session.

17 Claims, 4 Drawing Sheets

(56) References Cited

U.S. PATENT DOCUMENTS

| | | | |
|---|---|---|---|
| 10,044,871 B2 | 8/2018 | Bargetzi et al. | |
| 10,207,678 B2 | 2/2019 | Khan et al. | |
| 10,882,493 B2 | 1/2021 | Foster et al. | |
| 10,964,418 B2 * | 3/2021 | Gershfang | G06K 7/1417 |
| 11,259,140 B2 | 2/2022 | Konicek et al. | |
| 11,294,254 B2 | 4/2022 | Patterson et al. | |
| 11,302,126 B2 * | 4/2022 | Stevenot | G07C 9/00912 |
| 11,410,221 B2 * | 8/2022 | Zundel | G06Q 10/0833 |
| 11,438,169 B2 * | 9/2022 | Mani | H04L 67/52 |
| 11,443,856 B2 * | 9/2022 | Trpkovski | G16H 80/00 |
| 2014/0077929 A1 * | 3/2014 | Dumas | G07C 9/00571 |
| | | | 340/5.61 |
| 2015/0193864 A1 * | 7/2015 | Allison | G06Q 30/0645 |
| | | | 705/5 |
| 2016/0183351 A1 | 6/2016 | Snyder et al. | |
| 2017/0169635 A1 * | 6/2017 | Karlupia | G07C 9/21 |
| 2017/0270728 A1 * | 9/2017 | Troesch | G07C 9/00309 |
| 2019/0005750 A1 | 1/2019 | Eyring et al. | |
| 2020/0077892 A1 | 3/2020 | Tran | |
| 2020/0193753 A1 * | 6/2020 | Novozhenets | G07C 9/22 |
| 2021/0080947 A1 | 3/2021 | Doane et al. | |
| 2021/0217263 A1 * | 7/2021 | Mukundala | G06V 40/172 |
| 2021/0366216 A1 * | 11/2021 | Vos | G07C 9/00896 |
| 2021/0373402 A1 | 12/2021 | Shrivastava et al. | |

* cited by examiner

# SYSTEM AND METHOD FOR ULTRA-WIDEBAND SHORT-RANGE LOCATION ACCESS

FIELD OF THE INVENTION

The present invention embraces a system for secure access and initiation using a remote terminal.

BACKGROUND

Safe-deposit boxes are a secure means of storing important documents, jewelry, keepsakes and other valuables. Typically, a safe-deposit box may be protected by two keys, a personal key provided to the primary user by the entity, and a guard key that is retained by the entity. When a primary user wishes to access the safe-deposit box, the primary user may provide their personal key and an employee associated with the entity, and the employee may provide their guard key. Using both keys, the primary user may gain access to the sealed vault and/or their safe-deposit box. There is a need for a system for secure access and initiation using a more seamless and secure technology.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

The present invention utilizes ultra-wideband technology in order to provide a seamless manner for a user to authenticate themselves and gain access to a physical safe-deposit box at an entity location. Each of the devices carried by the user may emit encrypted messages of predefined patterns which are specific to the user devices themselves. When multiple devices from different users emit encrypted messages to establish connection with the safe-deposit boxes, these predefined patterns are used to pair the registered devices with the designated safe-deposit boxes registered to the user.

In one aspect, a system for secure access and initiation using a remote terminal is presented. The system comprising: at least one non-transitory storage device; and at least one processing device coupled to the at least one non-transitory storage device, wherein the at least one processing device is configured for: determining that a user has entered a secure environment, wherein determining that the user has entered the secure environment further comprises identifying an ultra-wideband frequency emitted from a known user device within the secure environment via an ultra-wideband frequency receiver; generating a digital authentication key in response determining the user has a scheduled session in the secure environment and that the user has entered the secure environment at the scheduled session time; receiving a second transmission from the known user device via the ultra-wideband frequency, wherein the second transmission comprises a digital authentication key; and verifying the digital authentication key as being correlated to the scheduled session and the known user device.

In some embodiments, determining that the user has entered the secure environment further comprises identifying an ultra-wideband frequency of the known user device as being located within a threshold proximity of the secure environment.

In some embodiments, the invention further comprises performing unlocking and opening operations on a safe-deposit box based on the verification of the digital authentication key.

In some embodiments, the digital authentication key further comprises a device-specific encrypted one-time-use key.

In some embodiments, the digital authentication key is valid for a pre-set time period corresponding to the scheduled session.

In some embodiments, the invention further comprises determining that the user has registered a computing device associated with the user further by referencing a system database of one or more onboarded user devices.

In some embodiments, the invention is further configured to transmit a signal to automatically lock a safe-deposit box upon determining that the known user device is a distance beyond a pre-set threshold limit from the safe-deposit box, wherein the distance is determined via an ultra-wideband chip of the safe-deposit box.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
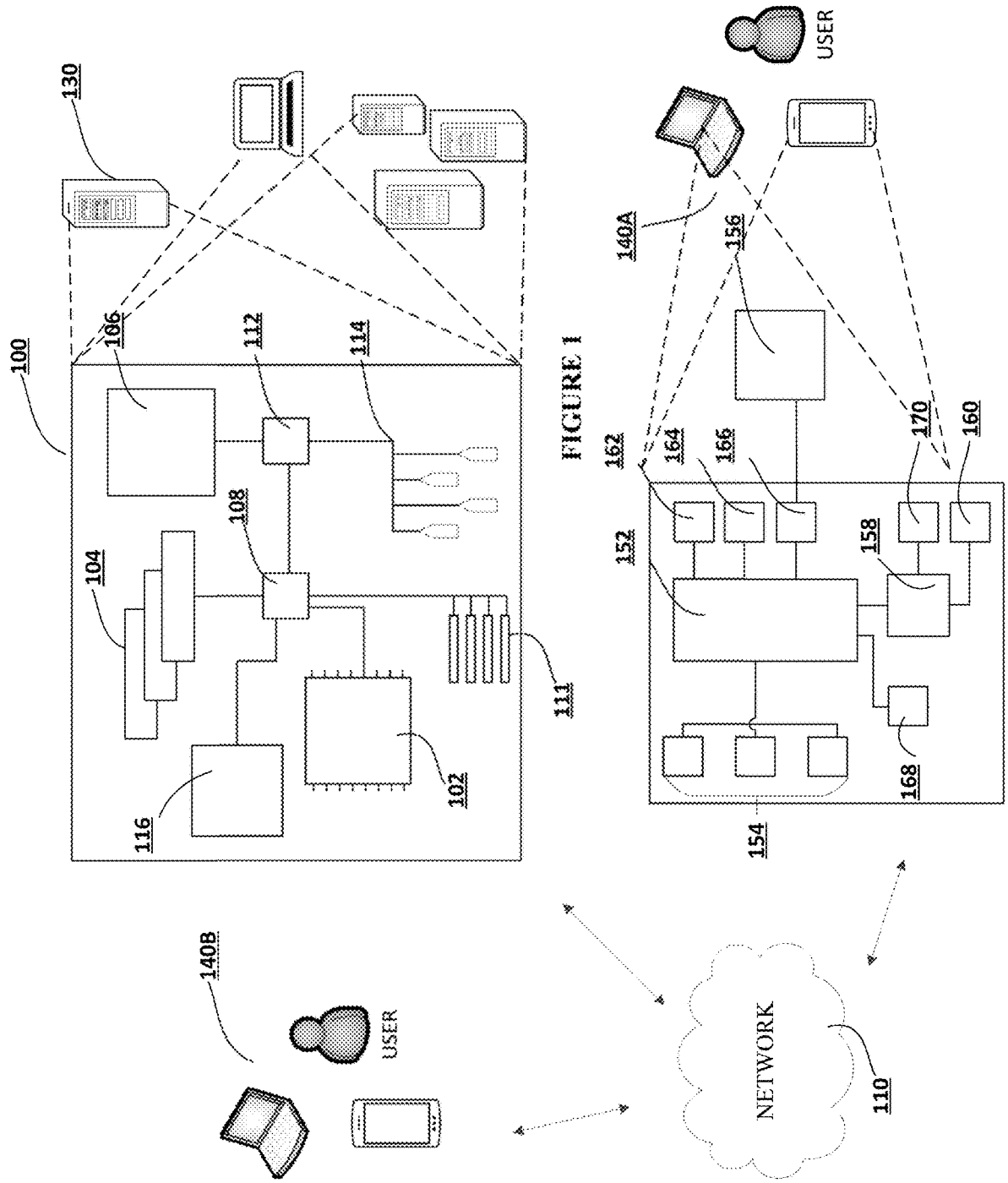
Figure 2:
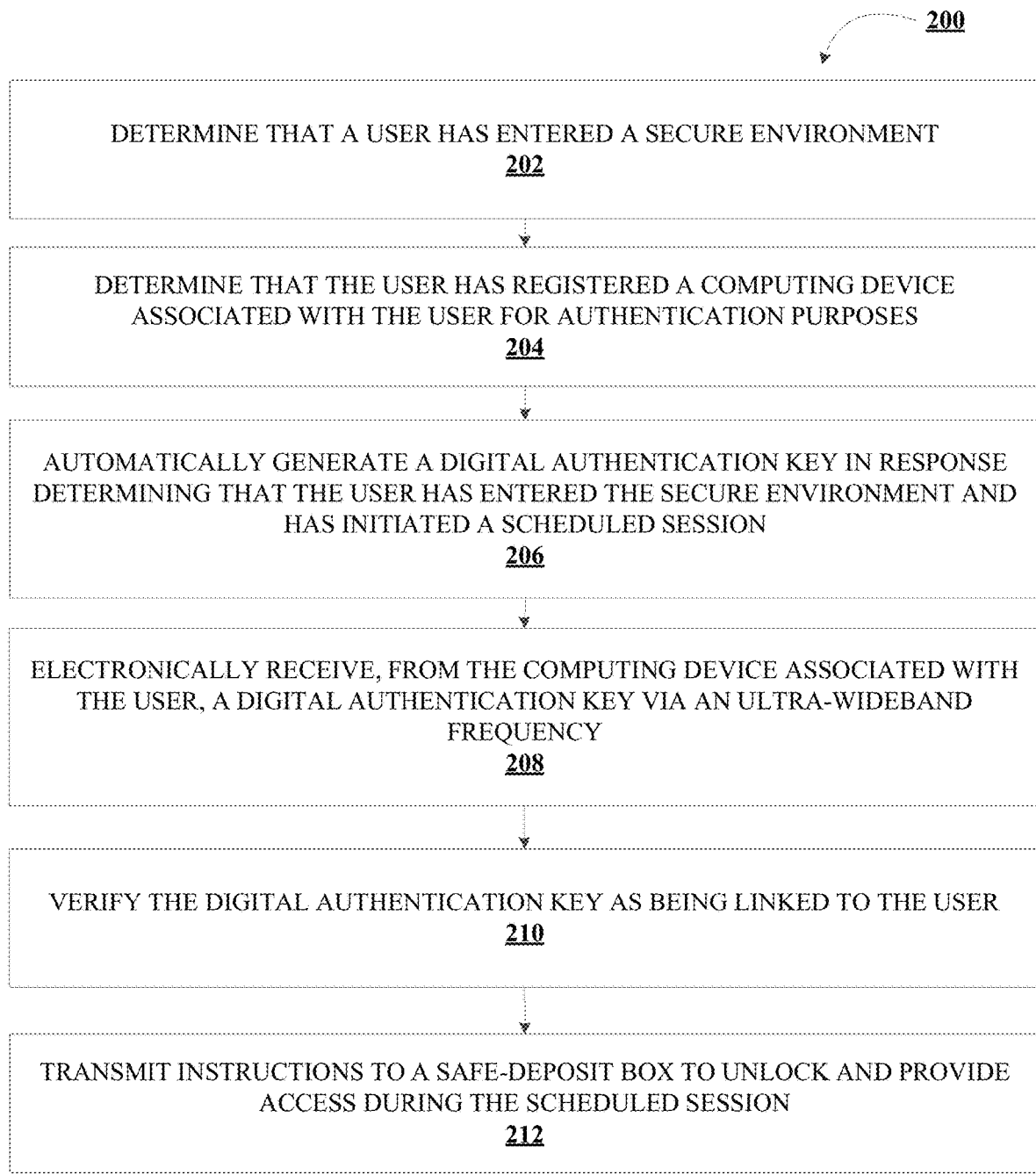
Figure 3:
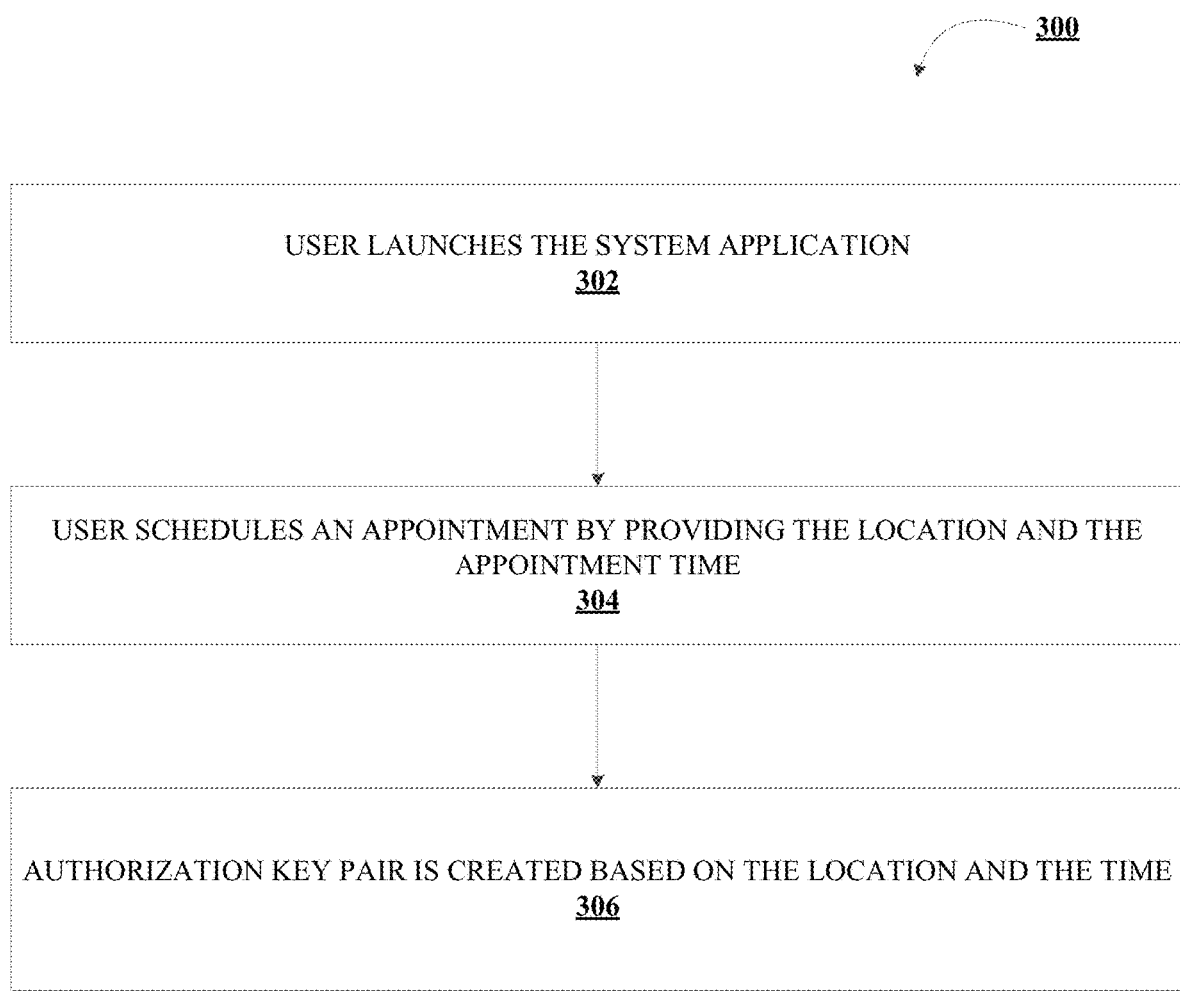
Figure 4:
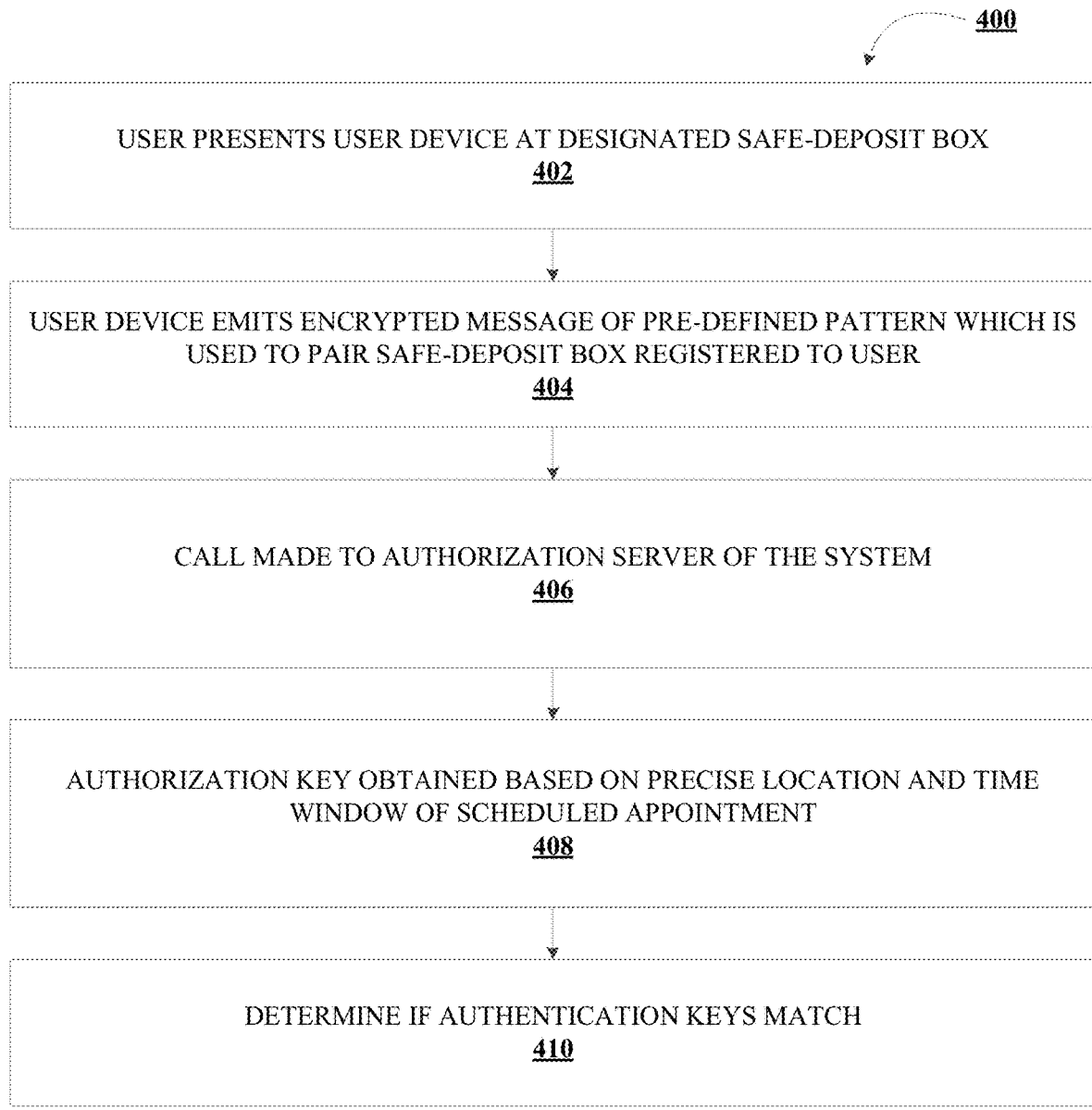

Having thus described embodiments of the invention in general terms, reference will now be made the accompanying drawings, wherein:

FIG. 1 illustrates technical components of a system for short-range location access, in accordance with an embodiment of the invention;

FIG. 2 illustrates a process flow for short-range location access, in accordance with an embodiment of the invention;

FIG. 3 illustrates a process flow for user scheduling and key pair request, in accordance with an embodiment of the invention; and FIG. 4 illustrates a process flow for short-range location access, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

Safe-deposit boxes are a secure means of storing important documents, jewelry, keepsakes and other valuables. These boxes are located inside a sealed vault (secure environment) and are often protected by many layers of security, which can include alarms, cameras and motion detectors. Typically, a safe-deposit box may be protected by two keys, a personal key provided to the primary user by the entity, and a guard key that is retained by the entity. When a primary user wishes to access the safe-deposit box, the primary user may provide their personal key and an employee associated with the entity, and the employee may provide their guard key. Using both keys, the primary user may gain access to the sealed vault and/or their safe-deposit box.

It would be advantageous to implement a system where the user may use an electronic device to gain access to their safe-deposit box. This proposed invention aims at providing enhanced intelligence in handling the safe-deposit box operations using the technology of ultra-wideband communication chips. This solution helps in reducing human error, chance of misplacing or losing a physical key, and also reduces the chances of unauthorized access via the user end or the entity end in cases where the entity may be compromised. Ultra-wideband chip technology helps in precisely locating, improving the spatial awareness and communicating with other ultra-wideband equipped devices. An ultra-wideband chip enabled safe-deposit box can securely communicate via encrypted messages with the entity and the user's designated ultra-wideband enabled registered device. In some embodiments, the user may own one or more registered ultra-wideband equipped devices. Using these devices, the customer may access an entity application and onboard their ultra-wideband equipped device for authentication with their safe-deposit box. Likewise, the safe-deposit boxes of the entity may be equipped with ultra-wideband chips or ultra-wideband receivers, transponders, or the like, so that they can establish a communication with customer's ultra-wideband chip enabled device. In this way, the user may use their electronic device to schedule an appointment to access their safe-deposit box, provide all the necessary appointment information, and plan to visit a specific entity location at a specific time. The appointment is registered with the entity servers, and this creates an authentication key, which may be embedded with hashed information related to the appointment time, precise location of the safe-deposit box, or the like, as provided by the ultra-wideband chip of the safe-deposit box itself. As the user enters the entity location at the appointed time, entity personnel, such as a guard, may guide the user to the vault. The customer may use their ultra-wideband equipped device to locate the safe-deposit box, and an automatic communication may take place between the user device and the safe-deposit box once the two ultra-wideband chips are within a given proximity. On successful authentication, the safe-deposit box unlocks, and the user can proceed to access it.

In some embodiments, a primary user may be required to provide their personal key to a secondary user and communicate their intention to have the secondary user to access the safe-deposit box and retrieve/place items of value from/to the safe-deposit box to the entity. The present invention may allow the primary user to virtually transfer their key via the entity application, such that a secondary user may have temporary access rights via an ultra-wideband equipped user device to access the safe-deposit box. In addition to communicating their intention, the primary user may be required to provide information associated with the secondary user to the entity such that the entity may confirm the identity of the secondary user prior to allowing the secondary user to accept temporary access rights. Once the identity of the secondary user is confirmed via an onboarding process, and their device is registered with an entity server, the secure environment may allow the secondary user to access one or more safe-deposit boxes according to how access is delegated by the primary user.

FIG. 1 illustrates technical components of a system for short-range location access, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input systems 140A and 140B. In some embodiments, the system 130, and the user input systems 140A and 140B may be used to implement the processes described herein, in accordance with an embodiment of the present invention. In this regard, the system 130 and/or the user input systems 140A and 140B may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, automated teller machine devices, electronic kiosk devices, blade servers, mainframes, or any combination of the aforementioned. In accordance with embodiments of the invention, the user input systems 140A and 140B is intended to represent various forms of mobile devices, such as personal digital assistants, cellular telephones, smartphones, augmented reality devices, extended reality devices, virtual reality devices, and other similar computing devices. The components shown here, their connections and relationships, and their functions, are meant to be exemplary only, and are not meant to limit implementations of the inventions described and/or claimed in this document. In preferred embodiments, the system 130 may represent one or more electronic devices which contain an ultra-wideband chip. Ultra-wideband (UWB) is a radio-based communication technology for short-range use and fast and stable transmission of data. UWB is often the technology of choice for indoor localization of moving objects in complex and space-sensitive environments. UWB is a radio technology that can use a very low energy level for short-range, high-bandwidth (e.g., (>500 MHz, or the like) communications over a large portion of the radio spectrum. UWB is useful for real-time location systems, and its precision capabilities and low power make it well-suited for radio-frequency-sensitive environments, such as financial entity locations. UWB is also useful for peer-to-peer fine ranging, which allows many applications based on relative distance between two entities. In some embodiments, UWB is based on the IEEE 802.15.4.z standard.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input systems 140A and 140B. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input systems 140A and 140B, in accordance with an embodiment of the invention. For purposes of the present invention, user input system 140A may be used by the primary user and the user input system 140B may be used by the secondary user. The electronic component structure of the user input system 140A and 140B may be same or similar. While FIG. 1 illustrates the exemplary electronic component structure of user input system 140A, it is to be understood that the same or similar electronic component structure is to be associated with user input system 140B. Accordingly, the user input system 140A may include a processor 152, memory 154, an input/output device such as a display 156, a communication interface 158, and a transceiver 160, among other components. The user input systems 140A and 140B may each also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input systems 140A and 140B, including instructions stored in the memory 154. The processor may be implemented as a chipset of chips that include separate and multiple analog and digital processors. The processor may be configured to provide, for example, for coordination of the other components of the user input system 140A, such as control of user interfaces, applications run by user input system 140A, and wireless communication by user input system 140A.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input systems 140A and 140B with other devices. External interface 168 may provide, for example, for wired communication in some implementations, or for wireless communication in other implementations, and multiple interfaces may also be used.

The memory 154 stores information within the user input system 140A. The memory 154 can be implemented as one or more of a computer-readable medium or media, a volatile memory unit or units, or a non-volatile memory unit or units. Expansion memory may also be provided and connected to user input system 140A through an expansion interface (not shown), which may include, for example, a SIMM (Single In Line Memory Module) card interface. Such expansion memory may provide extra storage space for user input system 140A or may also store applications or other information therein. In some embodiments, expansion memory may include instructions to carry out or supplement the processes described above and may include secure information also. For example, expansion memory may be provided as a security module for user input system 140A and may be programmed with instructions that permit secure use of user input system 140A. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140A to transmit and/or receive information or commands to and from the system 130 via the network 110. In this regard, the system 130 may be configured to establish a communication link with the user input systems 140A and 140B, whereby the communication link establishes a data channel (wired or wireless) to facilitate the transfer of data between the user input systems 140A and 140B and the system 130. In doing so, the system 130 may be configured to access one or more aspects of the user input systems 140A and 140B, such as, a GPS device, an image capturing component (e.g., camera), a microphone, a speaker, or the like. In one aspect, the image capturing component may be an omnidirectional image capturing device capable of capturing immersive experience of the user by recording the user's view in every direction at the same time. The resulting moving image may be viewed via personal computers, mobile devices by allowing the user to pan around the video by clicking and dragging. On mobile devices such as smartphones, the internal sensors such as the gyroscope can also be used to pan the moving image based on the orientation of the device. On head-mounted displays, the moving image may be viewed with the perspective moving as the head moved, providing a deep sense of immersion.

The user input system 140A may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140A, which may be used as appropriate by applications running thereon, and in some embodiments, one or more applications operating on the system 130.

In preferred embodiments, the user input systems 140A and 140B may represent one or more electronic devices which contain an ultra-wideband chips. Ultra-wideband (UWB) is a radio-based communication technology for short-range use and fast and stable transmission of data. UWB is often the technology of choice for indoor localization of moving objects in complex and space-sensitive environments. As such, the user input systems 140A and 140B may enable the user to provide an entity system, such as system 130, with their precise location, and transmit other important data, such as tokenized or encrypted authorization data from an entity application on the user input systems 140A and 140B.

The user input system 140A may also communicate audibly using audio codec 162, which may receive spoken information from a user and convert it to usable digital information. Audio codec 162 may likewise generate audible sound for a user, such as through a speaker, e.g., in a handset of user input system 140A. Such sound may include sound from voice telephone calls, may include recorded sound (e.g., voice messages, music files, etc.) and may also include sound generated by one or more applications operating on the user input system 140A, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input systems 140A and 140B are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input systems 140A and 140B may have a client-server relationship, where the user input system 130 makes a service request to the system 130, the system 130 accepts the service request, processes the service request, and returns the requested information to the user input systems 140A and 140B, and vice versa. This relationship of client and server typically arises by virtue of computer programs running on the respective computers and having a client-server relationship to each other.

In some embodiments, the system environment 100 may include a safe-deposit box (not shown). In one aspect, the safe-deposit box may be an autonomous Internet-of-Things (IoT) device that is capable of being communicably and operatively connected to one or more other devices, such as the system 130 and user input systems 140A and 140B, and configured to communicate with the one or more other devices independently of user intervention, within a mutual network environment, such as the system environment 100. The safe-deposit box may include one or more securable compartments with individual doors that are capable of housing items of value for the user. In preferred embodiments, the safe-deposit box may include a UWB chip in order to provide a real-time precise location beacon for locating the safe-deposit box and also identifying nearby user input systems 140A and 140B. Each compartment may be associated with a dedicated sensor that may be configured to track the status of the compartment. In some embodiments, the status of the compartment may include determining whether the compartment is locked or unlocked based on the position of their corresponding doors. When the status of the compartment changes from locked to unlocked, or vice versa, the safe-deposit box may be configured to communicate the status of the compartment to the system 130 and the user input systems 140A and 140B. To achieve this, the safe-deposit box may be network-enabled, i.e., capable of communicating with other devices via the network 110 and may be configured to be an active IoT device within the system environment 100. Active IoT devices are capable of both transmitting and receiving data. For example, the safe-deposit box may be an active IoT device when configured to perform self-analysis, communicate with the system 130 to update status of each compartment, and/or transmit notifications when specific conditions are met.

In some embodiments, each compartment within the safe-deposit box may be configured to lock/unlock independently of the other. Accordingly, each compartment may be controlled by an individual locking mechanism capable of being accessed using unique authentication credentials (such as a digital authentication key communicated via the user input systems 140A and 140B). A user (primary user) who uses the safe-deposit box to store valuable items may have access the entire safe-deposit box and its multitude of compartments. The user may store various items of value in various compartments for safe keeping. In cases where the primary user is unable to physically access the safe-deposit box but wishes to access the items stored in specific compartments, the primary user may authorize the secondary user to access particular compartments within the safe-deposit box. In this regard, the primary user may provide the secondary user with authentication credentials or delegated short-term access rights specific to the particular compartments so that the secondary user may be limited in their access to the primary user's safe-deposit box.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for short-range location access, in accordance with an embodiment of the invention. As shown in block 202, the process flow includes determining that a user has entered a secure environment. In some embodiments, the secure environment may include electronic circuitry (such as UWB chips, cameras, video cameras, motion sensors, or the like) capable of transmitting control signals to the system when a user is detected within the boundaries of the secure environment associated with the safe-deposit box. In one aspect, the secure environment may be configured to establish a communication link with a computing device associated with the user when the user enters the secure environment. In such cases, the computing device of the user may be pre-registered with the entity, thus allowing the secure environment to identify that the person that has entered the secure environment is the user.

In some embodiments, the secure environment may include a safe-deposit box associated with the user. As described herein, the safe-deposit box may include one or more individual compartments, with each compartment capable of being locked individually. In one aspect, a secure environment may be a physical space (e.g., vault) within a structure associated with the entity (e.g., financial institution branch) where items of value are stored. In some embodiments, the secure environment may refer to the physical space where the entity houses a number of safe-deposit boxes. In some other embodiments, the secure environment may refer to the physical space where the entity houses only the safe-deposit box associated with the user.

Next, as shown in block 204, the process flow includes determining that the user has registered a computing device associated with the user for authentication purposes. In some embodiments, this may include an onboarding process via a system-hosted application on the user computing system, such as a mobile application, wherein the mobile application may collect information from the user and the user computing system in order to verify the user's identity. In some embodiments, this may entail leveraging the use of one or more biometric authentication components of the user computing system (e.g., a fingerprint scanner, facial scan system, voice verification system, or the like). In other embodiments, the user may provide a passcode, three-step authentication code, or the like in order to verify their identity. In some embodiments, the user computing system may contain a UWB chip with a specific device signature associated with it, wherein the signature is unique to the user computing device or the UWB chip itself. The system application may request access rights to the UWB chip or its data in order to leverage use of the UWB chip at a later time, or in order to register the user computing device signature or device ID with the user's identity.

Next, as shown in block 206, the process flow includes automatically generating a digital authentication key in response determining that the user has entered the secure environment and has initiated a scheduled session. The generated digital authentication key may be used to unlock the safe-deposit box (or any particular compartment within the safe-deposit box. In some embodiments, the digital authentication key may be a one-time password (OTP) that is valid for only one login session or transaction or in this case, access to the first compartment. Once the digital authentication key is used, it is no longer valid. In other embodiments, the digital authentication key may be valid for a set period of time corresponding to the scheduled session. In some embodiments, the user may manage one or more scheduled sessions via the system application on the user computing system. For instance, the user may select a time, day, specific location, or the like in which they would like to access a safe-deposit box belonging to them. The system may log this information and use the user's identity information, device information, or the like, and generate a hashed or encrypted digital authentication key unique to the user, the user device, the UWB chip of the user device, or the like, and the digital authentication key may be stored on the system or locally on the user computing system. Via use of a pre-shared key mechanism, digital authentication keys which are locally stored on the user device may still be recognized by the system at a later time when provided on-location by the user computing system via UWB communication to the safe-deposit box.

In some embodiments, the system may be configured to electronically receive, from the computing device associated with the user, the digital authentication key. In this regard, the system may be configured to communicate via the computing device of the user an indication that the user has entered the secured environment. In response, the system may be configured to electronically receive, from the computing device of the user, a user input specifying the compartment that the user requires access to. In response, the system may be configured to initiate a digital authentication key generator on the computing device of the user. The user may generate the digital authentication key using the digital authentication key generator of the system application. The generated digital authentication key may be used to unlock the safe-deposit box, or a specific compartment associated with the safe-deposit box. In some embodiments, the system may be configured to enable the user to generate multiple digital authentication keys for multiple compartments associated with the safe-deposit box. In some other embodiments, the system may be configured to enable the user to generate a single digital authentication key capable of unlocking multiple compartments associated with the safe-deposit box. In other embodiments, the system application may use permissioned access to the UWB chip of the user device in order to guide the user to the location of the safe-deposit box, by interfacing with a UWB chip of the safe-deposit box.

Next, as shown in block 208, the process flow includes electronically receiving, from the computing device associated with the user, an authorization to transmit the digital authentication key. In some embodiments, the system authorization may include information associated with one or more compartments the user may access, a number of times the user can use the digital authentication key (OTP or otherwise), a period of time the digital authentication key will remain active until the user will require re-authorization, and/or the like.

Next, as shown in block 210, the process flow includes verifying the digital authentication key as being linked to the user or the user computing system. As mentioned, this may be done via storage of the digital authentication key on the system itself at time of creation for later cross-reference, or the digital authentication key may be decrypted by the system after being received via the safe-deposit box via use of a pre-shared key. If the digital authentication key can be verified as containing the authentication information for the user and the scheduled session, the system may transmit instructions to the safe-deposit box to unlock and provide access during the scheduled session, as indicated in block 212.

In some embodiments the system may be configured to transmit control signals configured to cause the safe-deposit box to unlock a first compartment associated with the safe-deposit box. In some embodiments, the system may be configured to allow the user to provide the digital authentication key and unlock the first compartment only after the scheduled session has been initiated. In some other embodiments, the system may be configured to allow the user to provide the digital authentication key and unlock the compartment contemporaneously with the session being initiated.

In some embodiments, the system may be configured to determine that the user has terminated the scheduled session prior to locking the safe-deposit box. In response, the system may be configured to automatically trigger control signals configured to lock the safe-deposit box. In response, the system may be configured to transmit a notification to the computing device of the user indicating that the user has terminated the session prior to locking the safe-deposit box, and that the safe-deposit box has been locked as a consequence.

In some embodiments, the system may be configured to continuously monitor the scheduled session. In this regard, the system may be configured to log the user's exact location via the UWB frequency emitted from the user computing system. In one aspect, the system may be configured to determine that the user is a distance from the safe-deposit box, or that there is an unrecognized UWB signal being emitted too close to the safe-deposit box for a period of time beyond a pre-set safety threshold. In response, the system may be configured to automatically trigger control signals configured to lock the safe-deposit box. In addition, the system may be configured to transmit a notification to the computing device of the primary user indicating that the safe-deposit box was not within an acceptable distance from the user, or that the presence of a potentially unauthorized user has been identified, and that the safe-deposit box has been locked as a consequence.

FIG. 3 illustrates a process flow for user scheduling and key pair request, in accordance with an embodiment of the invention. As illustrated in block 302, the user may launch a system application on the user system device in order to access the system for short-range location access to their safe-deposit box. After the onboarding process described above with regard to FIG. 2, the user may schedule an appointment by providing a location and appointment time that they wish to access their designated safe-deposit box, as illustrated in block 304. At this point, the system may generate an authorization key pair, or digital authentication key, based on the location and time of the user's requested appointment, as shown in block 306. As discussed with regard to FIG. 2, the digital authorization key may also include information, or be based on information, such as the user device ID, UWB chip ID, user credentials, user identity, or the like.

FIG. 4 illustrates a process flow for short-range location access, in accordance with an embodiment of the invention. The user presents a user device at the designated safe-deposit box, as shown in block 402. The user device emits an encrypted message including a pre-defined data pattern, which is used to pair the safe-deposit box registered to the user, as shown in block 404. Following this step, the safe-deposit box may initiate a call to a system server, as shown in block 406. An authorization key is obtained based on the precise location and time window of the user's scheduled appointment, as indicated in block 408. The system then determines if the user-provided digital authentication key matches the authorization key obtained based on the precise location and time window, and either authorizes or denies access based on the match or lack thereof, respectively.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for secure short-range location physical device access, the system comprising:
   at least one non-transitory storage device; and
   at least one processing device coupled to the at least one non-transitory storage device, wherein the at least one processing device is configured for:
   receiving data comprising a device identifier of a user device, a device identifier of an ultra-wideband chip of the user device, and authentication information for a user account, and storing the data as a known user device signature;
   determining that a user has entered a secure environment, wherein determining that the user has entered the secure environment further comprises identifying the known user device signature via an ultra-wideband frequency signal emitted from the known user device within the secure environment via an ultra-wideband frequency receiver located in the secure environment;
   accessing an entity server and retrieve data indicating the user has a scheduled session in the secure environment, wherein the scheduled session includes a scheduled session time in conjunction with the known user device signature;
   generating a digital authentication key in response determining the user has entered the secure environment at the scheduled session time;
   transmitting the digital authentication key to the user device via a system application installed on the user device;
   receiving a transmission from the user device via the ultra-wideband frequency receiver, wherein the transmission comprises the digital authentication key transmitted to the user device via the system application;
   verifying receipt of the digital authentication key; and
   remotely transmitting an unlocking operation to a safe-deposit box in the secure environment based on the verifying receipt of the digital authentication key is valid.

2. The system of claim 1, wherein determining that the user has entered the secure environment further comprises identifying an ultra-wideband frequency of the user device as being located within a threshold proximity of the secure environment.

3. The system of claim 1, wherein the digital authentication key further comprises a device-specific encrypted one-time-use key.

4. The system of claim 1, wherein the digital authentication key is valid for a pre-set time period corresponding to the scheduled session.

5. The system of claim 1, further comprising determining that the user has registered a computing device associated with the user further by referencing a system database of one or more onboarded user devices.

6. The system of claim 1, further configured to transmit a signal to automatically lock the safe-deposit box upon determining that the user device is a distance beyond a pre-set threshold limit from the safe-deposit box, wherein the distance is determined via an ultra-wideband chip of the safe-deposit box.

7. A computer program product for secure access and initiation using a remote terminal, the computer program product comprising a non-transitory computer-readable medium comprising code causing a first apparatus to:
   receive data comprising a device identifier of a user device, a device identifier of an ultra-wideband chip of the user device, and authentication information for a user account, and storing the data as a known user device signature;
   determine that a user has entered a secure environment, wherein determining that the user has entered the secure environment further comprises identifying the known user device signature via an ultra-wideband frequency signal emitted from the user device within the secure environment via an ultra-wideband frequency receiver;
   access an entity server and retrieve data indicating the user has a scheduled session in the secure environment, wherein the scheduled session includes a scheduled session time in conjunction with the known user device signature;
   generate a digital authentication key in response determining the user has entered the secure environment at the scheduled session time;
   transmit the digital authentication key to the user device via a system application installed on the user device;
   receive a transmission from the user device via the ultra-wideband frequency receiver, wherein the transmission comprises the digital authentication key transmitted to the user device via the system application;
   verify receipt of the digital authentication key; and
   remotely transmitting an unlocking operation to a safe-deposit box in the secure environment based on the verifying receipt of the digital authentication key is valid.

8. The computer program product of claim 7, wherein determining that the user has entered the secure environment further comprises identifying an ultra-wideband frequency of the user device as being located within a threshold proximity of the secure environment.

9. The computer program product of claim 7, wherein the digital authentication key further comprises a device-specific encrypted one-time-use key.

10. The computer program product of claim 7, wherein the digital authentication key is valid for a pre-set time period corresponding to the scheduled session.

11. The computer program product of claim 7, further comprising determining that the user has registered a computing device associated with the user further by referencing a system database of one or more onboarded user devices.

12. The computer program product of claim 7, further configured to transmit a signal to automatically lock the safe-deposit box upon determining that the user device is a distance beyond a pre-set threshold limit from the safe-deposit box, wherein the distance is determined via an ultra-wideband chip of the safe-deposit box.

13. A method for secure access and initiation using a remote terminal, the method comprising:
   receiving data comprising a device identifier of a user device, a device identifier of an ultra-wideband chip of the user device, and authentication information for a user account, and storing the data as a known user device signature;
   determining that a user has entered a secure environment, wherein determining that the user has entered the secure environment further comprises identifying the known user device signature via an ultra-wideband frequency signal emitted from the user device within the secure environment via an ultra-wideband frequency receiver located in the secure environment;

accessing an entity server and retrieve data indicating the user has a scheduled session in the secure environment, wherein the scheduled session includes a scheduled session time in conjunction with the known user device signature;

generating a digital authentication key in response determining the user has entered the secure environment at the scheduled session time;

transmitting the digital authentication key to the user device via a system application installed on the user device;

receiving a transmission from the user device via the ultra-wideband frequency receiver, wherein the transmission comprises the digital authentication key transmitted to the user device via the system application;

verifying receipt of the digital authentication key; and remotely transmitting an unlocking operation to a safe-deposit box in the secure environment based on the verifying receipt of the digital authentication key is valid.

14. The method of claim 13, wherein determining that the user has entered the secure environment further comprises identifying an ultra-wideband frequency of the user device as being located within a threshold proximity of the secure environment.

15. The method of claim 13, wherein the digital authentication key further comprises a device-specific encrypted one-time-use key.

16. The method of claim 13, further comprising determining that the user has registered a computing device associated with the user further by referencing a system database of one or more onboarded user devices.

17. The method of claim 13, further comprising transmitting a signal to automatically lock the safe-deposit box upon determining that the user device is a distance beyond a pre-set threshold limit from the safe-deposit box, wherein the distance is determined via an ultra-wideband chip of the safe-deposit box.

* * * * *